US005896265A

United States Patent [19]

Glaser et al.

[11] Patent Number: 5,896,265

[45] Date of Patent: *Apr. 20, 1999

[54] SURGE SUPPRESSOR FOR RADIO FREQUENCY TRANSMISSION LINES

[75] Inventors: James A. Glaser; Ronald W. Glaser, both of Fannin, Tex.; James E. Britton, Bryan, Okla.

[73] Assignee: ACT Communications, Inc., Ector, Tex.

[ * ] Notice: This patent is subject to a terminal disclaimer.

[21] Appl. No.: 08/867,326

[22] Filed: Jun. 2, 1997

Related U.S. Application Data

[63] Continuation-in-part of application No. 08/516,864, Aug. 18, 1995, Pat. No. 5,712,755

[60] Provisional application No. 60/019,240, Jun. 4, 1996.

[51] Int. Cl.[6] .................... H02H 3/22

[52] U.S. Cl. .................... 361/119; 361/56; 361/111

[58] Field of Search .................... 361/111, 113, 361/119, 91, 56

[56] References Cited

U.S. PATENT DOCUMENTS

| | | | |
|---|---|---|---|
| 2,030,179 | 2/1936 | Potter . | |
| 2,777,998 | 1/1957 | Shepherd . | |
| 2,886,744 | 5/1959 | McNatt . | |
| 2,922,913 | 1/1960 | Cushman . | |
| 3,274,447 | 9/1966 | Nelson . | |
| 3,777,219 | 12/1973 | Winters . | |
| 3,863,111 | 1/1975 | Martzloff . | |
| 3,968,411 | 7/1976 | Mueller . | |
| 4,050,092 | 9/1977 | Simokat . | |
| 4,142,220 | 2/1979 | Lundsgaard . | |
| 4,158,869 | 6/1979 | Gilberts . | |
| 4,359,764 | 11/1982 | Block . | |
| 4,409,637 | 10/1983 | Block . | |
| 4,419,711 | 12/1983 | Seguin | 361/111 |
| 4,554,608 | 11/1985 | Block . | |
| 4,630,163 | 12/1986 | Cooper et al. . | |
| 4,901,183 | 2/1990 | Lee | 361/56 |
| 5,122,921 | 6/1992 | Koss . | |
| 5,136,455 | 8/1992 | Billingsley . | |
| 5,388,021 | 2/1995 | Stahl | 361/56 |
| 5,493,469 | 2/1996 | Lace . | |
| 5,513,059 | 4/1996 | Atkins | 361/56 |

OTHER PUBLICATIONS

Sep. 22–23, 1981, Lightning Protection for Computer Data Lines O. Melville Clark, presented at the Electrical Overstress/Electrostatic Discharge Symposium, Las Vegas, Nevada, 6 pages.

Mar. 1, 1994, Quarter Wave Shorting Stub; Specifications Northern Technologies, Inc. 3 pages.

*Primary Examiner*—Jeffrey Gaffin
*Assistant Examiner*—Kim Huynh
*Attorney, Agent, or Firm*—Carr & Storm, LLP

[57] ABSTRACT

A surge suppressor for a radio frequency (RF) transmission line includes an a printed circuit board having a conductor for connection in series with a RF transmission line. The conductor has a capacitance for passing RF signals and blocking transients. To the printed circuit board are mounted a choke and a resistor, each of which is connected in series with the transmission line and in parallel to each other and to the capacitance of the conductor. The choke passes steady, direct current signals for powering equipment located on an antenna. The surge suppressor further includes first and second discharge stages connected to the conductor on opposite sides of the impedance. Each stage includes a discharge device connected to the conductor through a radio frequency choke or resonant circuit. The choke or resonant circuit blocks leakage of radio frequencies into the discharge devices. A gas discharge tube is used for the first stage, which is for connection to an antenna side of the surge suppressor. A solid state device, having a lower breakdown voltage than the gas discharge tube, is used in the second stage, which is for connection to voltage sensitive equipment. The resistor assists in isolating the first and second stages. The first stage further includes a second gas discharge tube having a breakdown voltage higher than the first gas discharge tube for use in warning of degradation of the first gas discharge tube.

21 Claims, 2 Drawing Sheets

SURGE SUPPRESSOR FOR RADIO FREQUENCY TRANSMISSION LINES

CROSS-REFERENCES TO RELATED APPLICATIONS

This application is a continuation-in-part of U.S. Pat. No. 5,712,755, formerly patent application Ser. No. 08/516,864, to James A. Glaser, Ronald W. Glaser, and James E. Britton, entitled "SURGE SUPPRESSOR FOR RADIO FREQUENCY TRANSMISSION LINES", filed Aug. 18, 1995, and issued Jan. 27, 1998; and also claims priority from U.S. Provision patent application No. 60/019,240 to James A. Glaser et al. entitled "IMPROVED SURGE SUPPRESSOR FOR RADIO FREQUENCY TRANSMISSION LINES" filed Jun. 4, 1996.

TECHNICAL FIELD OF THE INVENTION

The invention relates generally to methods and apparatus for suppressing transient voltages, such as those caused by lightning, on transmission lines carrying radio frequency signals.

BACKGROUND OF THE INVENTION

A common example of a transmission line carrying radio frequency (RF) signals is a coaxial cable connecting an antenna to a voltage-sensitive equipment such as a receiver or transmitter. Often unprotected and exposed to the atmosphere, antennas and the transmission lines connecting the antennas to equipment are subject to high energy transient voltages or surges caused by lightening and, consequently, so too are the transmitters and receivers. Most such equipment have solid state devices at their input and/or output circuits. Since solid state devices have low breakdown voltages, at least as compared to vacuum tubes, a voltage surge can cause substantial damage to the equipment.

In order to protect voltage-sensitive equipment from damage caused by high voltage surges, a surge suppressor, sometimes also referred to as a surge arrestor or protector, is inserted between a transmission line and the equipment where the transmission line may be exposed to induced surges. The arrestor functions to shunt or discharge to ground high voltage transient signals. Several different types of discharge devices are available. An air gap device has two closely-spaced conductors, separated by an air gap. When a voltage differential across the gap reaches a sufficiently high level, the air ionizes and begins to conduct, thus discharging the surge to ground. An air gap device does not provide adequate protection for solid state components. A relatively high-voltage differential is required before it will conduct. It also has a slow response time. Furthermore, the conductors breakdown after a few lightening strikes. Thus, air gaps tend to be less reliable than other discharge devices.

Gas discharge tubes, on the other hand, tend not to deteriorate from frequent discharges. Relatively small, compact gas tubes are also able to handle large currents. However, at the relatively low discharge voltage thresholds desired for equipment with solid state devices, a gas discharge tube can be triggered by peak voltages in an RF signal, thus momentarily interrupting the signal. At higher discharge voltage thresholds, gas discharge tubes may not provide adequate protection. More importantly, gas discharge tubes have relatively slow response times. Therefore, some fast rising, high voltage spikes may not be discharged. Solid state discharge devices such as sidactors, avalanche type diodes and metal oxide varistors, on the other hand, have comparatively low voltage thresholds and quick response times for discharging transient voltages. However, solid state discharge devices have, as compared to similarly sized gas discharge tubes, low current handling capacity. Very large solid state devices are required for discharging large current surges, making them impractical to use in many applications.

All discharge devices have associated with them parasitic capacitances that tend to load the transmission line in the radio frequency range, thus attenuating the desirable RF signals. In a radio frequency application, therefore, a discharge device is preferably coupled to the transmission line in a manner that provides adequate and reliable protection and avoids significantly degrading or attenuating RF signals on the transmission line. Several examples of circuits for coupling various types of discharge devices, including an air gap discharge tube and a gas discharge tube, to RF transmission lines are disclosed in U.S. Pat. Nos. 4,359,764, 4,409,637 and 4,554,608 of Block.

Block's RF surge suppressor units include two connectors, two conductors, at least one discharge device and a capacitor, all of which are matched to the transmission line to pass RF signals. Segments of an RF transmission line are connected to the two connectors, and the two conductors interconnect the connectors. The discharge device is connected between one of the conductors and ground or between the two conductors, and the capacitor is inserted in line with one of the conductors. The impedances of the conductors, the capacitor and the discharge device are tuned so that the entire circuit matches the characteristic impedance of the transmission line at the desired operational radio frequencies, thus assuring minimal loss or attenuation of the RF signals travelling through the unit along the transmission line. The capacitor blocks direct current voltages commonly associated with transients caused by lightening from travelling through the surge arrestor. Once voltage on the transmission line builds to the breakdown voltage of the discharge device, the discharge device shunts the transient signal to ground.

In a surge arrestor unit disclosed in U.S. Pat. No. 5,122,921 of Koss, a capacitor is placed in line with one of the conductors of RF coaxial transmission line to block flow of direct current, just as in the circuits of Block. On the side of the capacitor to be connected to an antenna, a gas tube discharge device and a choke are connected in parallel with each other and between the inner conductor and the outer conductor of the RF transmission line (which is grounded). To the side of the capacitor to be connected with the voltage sensitive equipment is a resistor connected between the inner and outer conductors of the transmission line. The choke passes small direct current transients to ground. The capacitor, on the other hand, passes RF signals but not direct current signals. The choke creates a back emf when the speed and magnitude of a transient surge is sufficiently high to create a voltage that causes the discharge device to breakdown and conduct, thus protecting the capacitor. The resistor discharges any voltages on the equipment side of the capacitor.

The surge suppressor units of Block and Koss suffer from several problems. First, fast rising transients tend to pass through the in-line capacitor and to the equipment before the discharge device begins to conduct. Second, high voltages across the capacitor tend to cause a reverse transient flow of current from the equipment. Third, surge suppressors fabricated using conventional materials and methods, like those of Block, require that each unit be manually tuned during assembly. The impedances inherent in the conductors in each unit depend on the physical geometry of the conductors and the other components within the unit. The impedances will tend to vary between units due to the difficulty of precisely reproducing the physical layout of the units. Thus, tuning not only must take into account the variations in the inherent impedance of the discharge devices, but also the natural variations in the parasitic impedances of the conductors. Since surge suppressors such as those of Block rely on the parasitic reactances of the conductors to match the discharge device to the transmission line, careful tuning is critical for their satisfactory performance. Fourth, breakdown and conduction of the discharge device in both Block and Koss interrupts RF signal flow along the transmission line since the capacitance of the discharge device drops out of the circuit when it conducts. Fifth, the capacitors totally block the flow of direct current along the RF transmission line. However, RF transmission lines are now being used to deliver power to equipment located on an antenna, such as down converters and amplifiers. Thus, the surge suppressors of Block and Koss cannot be used in these RF transmitting and receiving systems.

SUMMARY OF THE INVENTION

A surge suppressor circuit for a radio frequency (RF) transmission line according to the present invention includes two discharge stages connected between the transmission line and ground, on opposite sides of an impedance means inserted in the RF transmission line. The impedance means passes RF signals in a band of interest but otherwise isolates the stages. The first stage is coupled to an antenna side of a transmission line. It includes a discharge device having a relatively high breakdown voltage and high power handling capability. The second stage is coupled to an equipment side of the transmission line. It includes a discharge device having a relatively low breakdown voltage and fast response time. Each discharge device is connected to the transmission line through a circuit which presents a high impedance to radio frequency signals of interest on the RF transmission line and low impedance to undesirable impulse signals. Thus, RF signal loss due to the inherent capacitance of the discharge device is substantially eliminated, but lower frequency signals associated with surges are able to flow freely through the circuit, to the discharge device, without significant attenuation. Furthermore, radio frequency signals are substantially blocked from flowing to ground when either of the discharge devices conduct, since the choke then acts as a low pass filter, passing only transients and lower frequency signals.

The invention overcomes the problems associated with the prior art and provides several advantages. First, the second discharge stage protects equipment from the effects of fast rising transients which pass through the impedance means or which are due to back-flow transients. The only impedance seen by RF signals on a transmission line is the impedance means. Second, the inherent capacitances of the discharge devices are, in effect, isolated from the transmission lines. Thus, tuning of the surge suppression circuit need not take into account variations in the inherent capacitance of the discharge devices. Third, the impedance means may be configured to pass a substantially steady direct current for powering equipment without substantially affecting voltage suppression performance of either the first or second stages. Thus, the invention can be used with those RF systems which have a direct current signal on the transmission line to power equipment located on an antenna. Fourth, a wide range of relatively low breakdown voltages are available in solid state discharge devices suitable for the second stage. Since the breakdown voltages of such devices can be made to relatively close tolerances, the breakdown level can be carefully selected and controlled to a level near the voltage of a direct current power signal without significant risk of causing unintended interruptions to the power signals.

In one embodiment of the invention, the circuit for coupling the discharge device to the RF transmission line includes a radio frequency choke of appropriate impedance to block coupling of RF signals to ground through the discharge device. In another embodiment of the invention for very high frequency applications, a capacitor is coupled in parallel to a choke in the second stage, between the transmission line and ground, thereby forming a tank-like resonant circuit for reducing insertion losses associated with stray capacitances in the circuit at very high frequencies. The resonance frequency of the circuit is selected to coincide with a predetermined frequency band of operation for the circuit, thus presenting a very high impedance path to ground for signals on the transmission line within the predetermined frequency band and a low impedance to signals far below and far above the predetermined band, including transient surges.

According to another aspect of the invention, components of a surge suppression circuit are mounted on, and electrically interconnected by, a printed circuit board. The printed circuit board's inherent capacitance forms part of an impedance means in series of an RF transmission line. Due to the close tolerances with which a printed circuit board is manufactured, the inherent capacitance and other parasitic impedances of the PCB are easily controlled. Thus, tuning is not typically required during assembly of the surge suppression circuit.

According to yet another aspect of the invention, a secondary discharge device is added in parallel to a primary discharge device of a surge suppression circuit. The secondary discharge device has a higher breakdown voltage and therefore conducts only when the voltage level on the RF transmission line increases to the higher breakdown voltage due to, for example, degradation of the current handling capacity of the primary discharge device. If the primary discharge device fails to properly discharge because its current handling capacity has been reduced, the voltage level on the RF line will continue to rise. To avoid false alarms caused by brief voltage peaks, the secondary discharge device is connected to ground through a fuse. Discharge of a large current will blow the fuse, causing current to flow to a high impedance alarm sensor.

The foregoing is intended to briefly describe certain features and technical advantages of the invention and its preferred embodiment described below. It is not intended to limit in any way the scope of the invention as set forth in the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
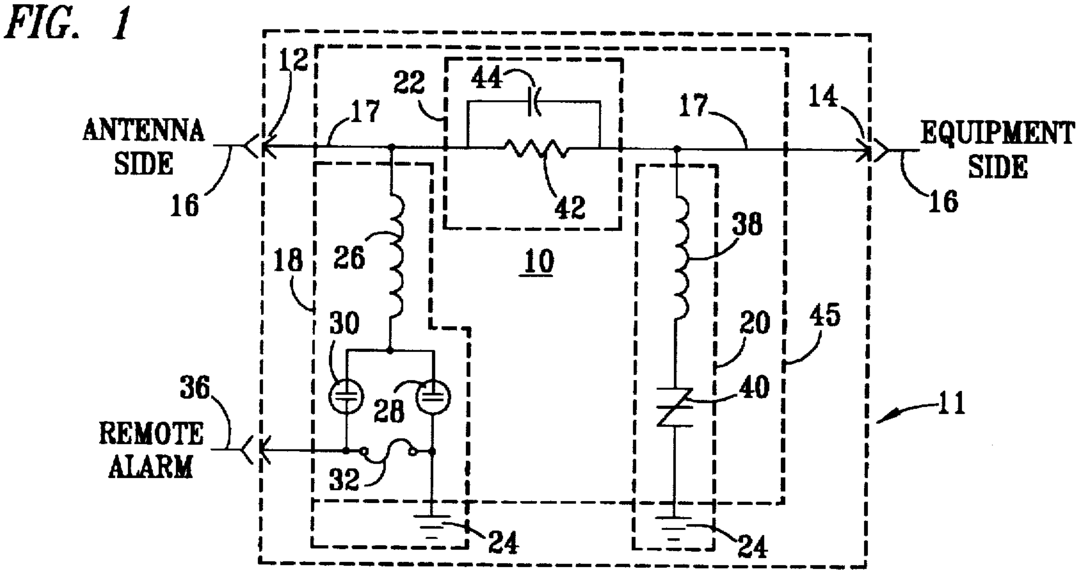
FIG. 1 is a schematic diagram for a surge suppression circuit for a radio frequency (RF) transmission line according to the present invention.

Referring to FIG. 1, surge suppression circuit 10 includes a first connector 12 and a second connector 14 for connecting the surge suppression circuit in series with a non-grounded conductor 16 of a radio frequency (RF) transmission line. Connector 12 is for connecting the circuit to a segment of the RF transmission line which is exposed to lightening or other surge inducing phenomena. In most applications, this segment will be connected to an antenna, and therefore it will be referred to as the antenna side of the transmission line. Connector 14 is for connecting the circuit to the segment of the transmission line leading to voltage sensitive equipment, and thus it will be referred to as the equipment side of the transmission line. The surge suppression circuit 10 will typically be located in close proximity to the voltage sensitive equipment. The type of connectors will depend on the type of transmission line. Connectors will be coaxial if the surge suppression circuit is to be connected to, for example, a coaxial transmission line.

The surge suppression circuit 10 includes, in addition to connectors 12 and 14, a conductor 17 which interconnects connectors 12 and 14, a first discharge stage 18, a second discharge stage 20 and an impedance circuit 22. For most applications, the circuit 10 is mounted within an enclosure, as indicated by dashed line 11. Connectors 12 and 14 are disposed on the exterior of the enclosure for connection with the RF transmission line. However, it is possible for the surge suppression circuit 10 to be integrated with an RF input circuit of the voltage sensitive equipment. The impedance circuit 22 is connected in series with conductor 17, and thus it is also in series with the equipment side and the antenna side segments of the transmission line 16. The first stage is connected between the antenna side of the conductor 17 and ground 24. The second stage is connected between the equipment side of the conductor 17 and ground 24. The ground is either connected to a second conductor of the RF transmission line or to a separate ground terminal on the enclosure for surge suppression circuit 10, which in turn is connected to ground.

Each of the first and second discharge stages 18 and 20 includes a choke in series with a discharge device. The chokes have high inductances which substantially block the flow of RF energy into the devices, thus preventing leakage of RF energy from the transmission line to the discharge tubes or solid state devices. The impedance of the choke in each stage interacts with the inherent capacitance of the discharge device to which it is connected to form a filter having a band pass substantially well below the radio frequency range. Once a discharge device breaks down and begins to conduct, its capacitance drops out. The choke and discharge device then form a low pass filter through which transients typically associated with lightening easily pass to ground. RF signals on the transmission line will not, however, pass to ground.

In the first discharge stage 18, choke 26 is in series with a primary gas discharge tube 28 and a secondary gas discharge tube 30, which are parallel to each other. The breakdown voltage of the secondary discharge tube is greater than that of the primary gas discharge tube. Increase of the voltage on the transmission line to the second breakdown voltage indicates that the discharge current discharging capacity of the primary gas discharge tube has degraded. The secondary gas discharge tube 30 is connected to ground through fuse 32. The value of fuse 32 is selected so that conduction of a significant amount of current by the secondary gas discharge tube 30 will tend to blow the fuse, thus creating an open circuit to ground 24. Current discharged by the secondary gas discharge tube then flows through alarm line connector 34 to alarm line 36, and then to a high impedance alarm sensor (not shown). Current flow into the alarm line thus is able to be sensed at a remote monitoring station, warning of the degradation of the primary gas discharge tube each time the voltage level of the transmission line rises to the breakdown voltage of the secondary tube.

In the second discharge stage 20, choke 38 is in series with a solid state discharge device 40, such as a sidactor, metal oxide varistor (MOV) or silicon avalanche diode (SAD). The breakdown voltage of the solid state device is selected so that it will not discharge at voltages of a direct current power signal on the transmission line for powering equipment on an antenna.

The impedance circuit 22 includes a resistor 42 in series with conductor 17. Capacitance 44 is illustrated using dashed lines to indicate that it is not a discrete component, but rather the capacitance inherent in a printed circuit board (PCB) 45 on which the components of the surge suppression circuit are mounted. These components include chokes 26 and 38, gas discharge tubes 28 and 30, solid state discharge device 40 and resistor 42. The thickness of the printed circuit board, the thickness and width of traces on the board, the layout of the traces on the printed circuit board, and the material from which the board and the traces are made are chosen to provide a predetermined inherent capacitance 44 such that a radio frequency signal within a preselected range will pass through impedance circuit 22 without significant attenuation. The parasitic inductance associated with the PCB and the wires which connect conductor 17 to the connectors 12 and 14 is minimal over most of the RF range. Thus, the inherent capacitance 44 of the PCB forms a high pass filter for RF signals of interest on the RF transmission line. Due to the good reproducibility of printed circuit boards, the inherent capacitance 44 and any parasitic inductance associated with the PCB are predictable and within tolerances sufficient so that tuning of the impedance means is not required for each unit produced. Variations in the inherent capacitance of the discharge devices in the each of the first and second stages need not be taken into account since chokes isolate the discharge devices from signals in the RF range on the transmission line. For high power RF signals, capacitance in excess of the inherent capacitance of the PCB may be required to prevent overheating of the PCB.

In operation, the second discharge stage 20 discharges relatively low voltage, fast rising transient signals which pass through the impedance circuit 22 before the solid state discharge device 40 breaks down. The second discharge device clamps the voltage on the equipment side of the transmission line to a relatively low suppression voltage. If the voltage continues to rise on the antenna side of the transmission line, the primary gas discharge tube 28 breaks down and clamps the antenna side to a low suppression voltage. The impedance circuit 22 isolates the first and second discharge stages, allowing different suppression voltage levels in the two stages. Even when the primary gas discharge tube 28 fails and the voltage on the antenna side of conductor 17 rises, the second discharge stage 20 will continue to clamp or suppress the voltage. Should the solid state discharge device fail, it will fail to a short, thus assuring that harmful voltages do not reach voltage sensitive equipment.

Figure 2:
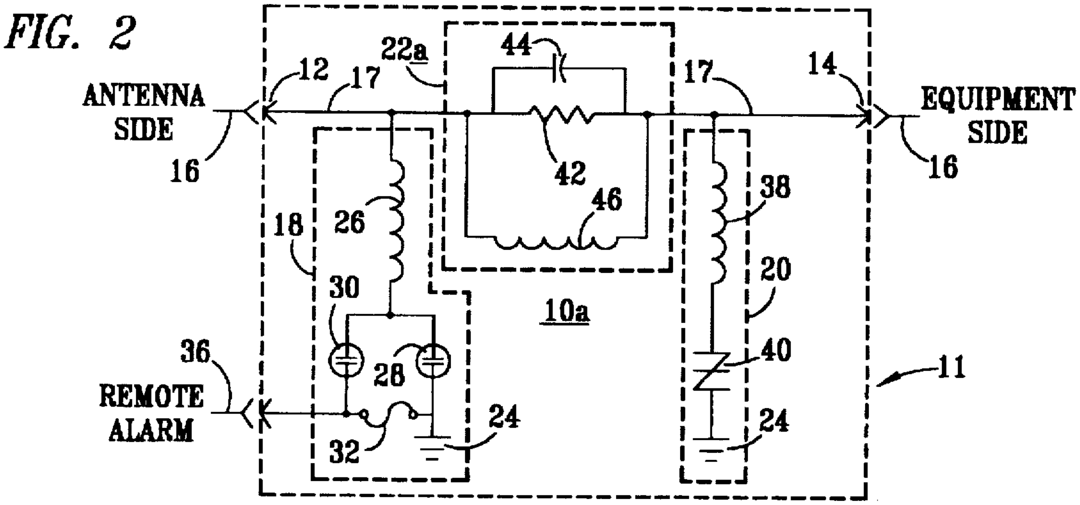
FIG. 2 is a schematic diagram of an embodiment for a surge suppression circuit according to the present invention having a direct current pass capability.
Figure 3:
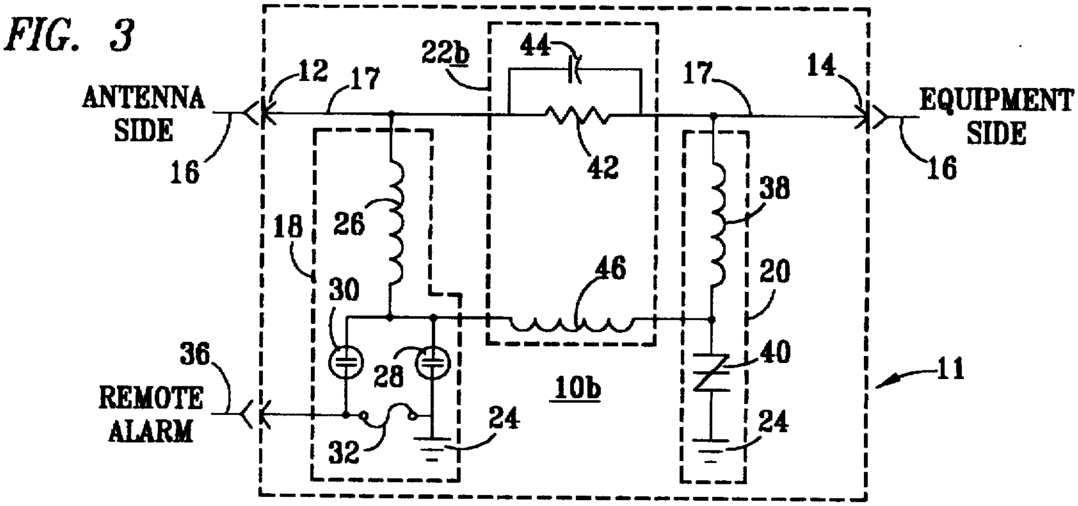
FIG. 3 is a schematic diagram of an alternate embodiment for the surge suppression circuit of FIG. 2.

Referring now to FIGS. 2 and 3, surge suppression circuit 10 is provided with an ability to pass direct current along conductor 17 by adding choke 46 to impedance circuit 22 (FIG. 1) in one of two locations, shown, respectively, by impedance circuits 22*a* and 22*b* of FIGS. 2 and 3. The choke 46 is placed in parallel with the inherent capacitance 44 of the PCB and resistance 42 to allow direct current of a fixed voltage to flow between connectors 12 and 14 without encountering significant impedance. Placement of choke 46 as shown in FIG. 2 tends to make impedance circuit 22 function as a band pass filter. Placement of choke 46 in series with the chokes 28 and 36, as shown in FIG. 3, introduces a significant amount of inductance in parallel with the capacitor 44, causing the impedance circuit 22 to function more like a high pass filter.

Figure 4:
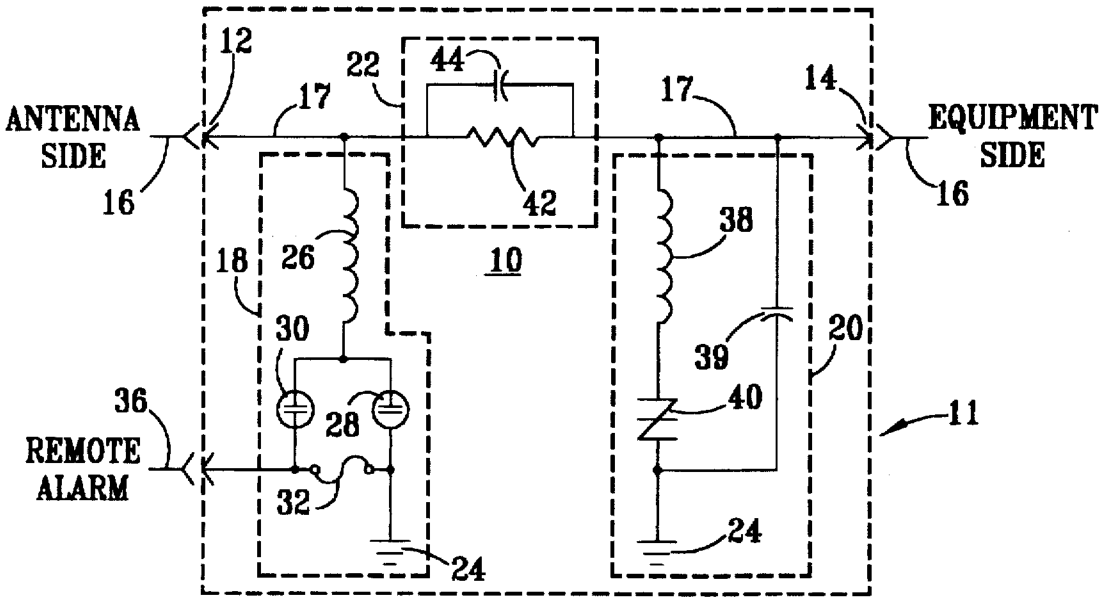
FIG. 4 is a schematic diagram for a surge suppression circuit for an RF transmission line operating at very high frequencies according to the present invention.
Figure 5:
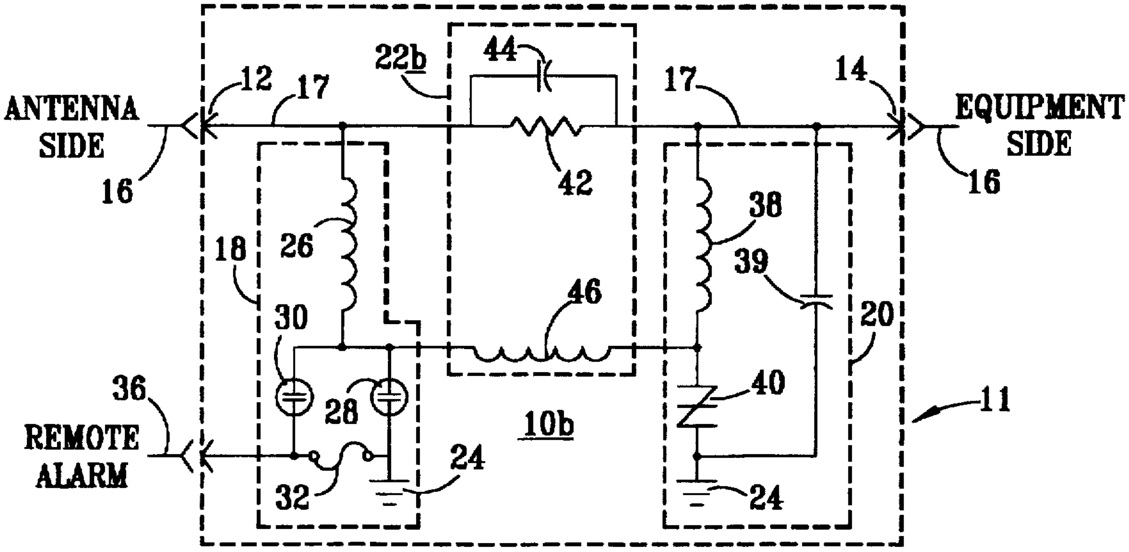
FIG. 5 is an alternate embodiment for the surge suppression circuit of FIG. 4.

Referring to FIGS. 4 and 5, when surge suppression circuits 10 and 10*b* operate at frequencies approaching and including the microwave frequency range, especially at frequencies above 1 GHz, signal losses at these frequencies tend to increase due to stray capacitances associated with the circuit. To counteract these insertion losses, capacitor 39 is placed in parallel with choke 38 and solid state discharge device 40. Capacitor 39 reacts to the inductance of choke 38 to form a tank-like resonant circuit. For signals on the transmission line 17 with frequencies around the resonant frequency of the tank circuit, capacitor 39, choke 38 and solid state discharge device 40 provide a very high impedance path to ground. The capacitance of capacitor 39 and the inductance of choke 38 are selected so that the resonance of the tank circuit falls within a predetermined range of operational frequencies for the surge suppression circuit 10 or 10*a*. To voltage surges or impulses having frequencies far below the resonant frequency, the tank circuit offers low impedance, allowing such signals to be discharged to ground once their voltages exceed the threshold voltage of the discharge device.

Other resonant circuit configurations, having similar frequency responses at the radio frequencies of interest and at the lower frequencies in which a substantial portion of the energy associated with voltage surges falls, could be substituted for the tank circuit. Furthermore, capacitor 39 may either be fixed or variable for permitting tuning to minimize RF signal loss at other frequencies.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. An apparatus for discharging transient voltages on a transmission line for transmitting a radio frequency (RF) signal comprising:

impedance means having first and second sides for interconnecting two segments of a conductor of a transmission line for passing a radio frequency signal;

a first radio frequency choke having one end connected to a first side of the impedance means and an opposite end coupled to a first means for discharging to ground when a voltage of a signal on the transmission line exceeds a first level; and a second radio frequency choke having one end coupled to a second side of the impedance means and an opposite end coupled to a second means for discharging to ground when a voltage of a signal on the transmission line exceeds a second level greater than the first level; and a capacitor coupled between the first side of the impedance means and ground, parallel to the first radio frequency choke, for providing a circuit with high impedance to desired radio frequency signals and low impedance to undesirable radio frequency signals.

2. An apparatus in accordance with claim 1 wherein the impedance means further includes means for passing a substantially steady direct current.

3. An apparatus in accordance with claim 1 wherein:

the apparatus includes a printed circuit board;

the first and second chokes and the first and second means for discharging are mounted to, and electrically interconnected by, the printed circuit board; and the impedance means includes inherent capacitance associated with the printed circuit board for passing the radio frequency signal.

4. An apparatus in accordance with claim 1 wherein the second means for discharging includes a primary gas discharge tube and a secondary gas discharge tube connected in parallel to each other and in series between the second radio frequency choke and ground, the primary gas tube having a breakdown voltage equal to the second level and the secondary gas tube having a breakdown voltage greater than the second level.

5. An apparatus in accordance with claim 4 further including means for indicating failure of the primary gas tube in response to the secondary gas tube discharging.

6. An apparatus in accordance with claim 5 wherein the means for indicating failure includes a fuse in series between the secondary gas discharge tube and ground, and means for communicating current discharged by secondary gas discharge tube to a remote alarm sensor in response to the fuse blowing.

7. An apparatus in accordance with claim 1 wherein the first means for discharging includes a solid state discharge device and the second means for discharging includes a gas discharge device.

8. An apparatus in accordance with claim 1 wherein the first side of the impedance means is electrically coupled to voltage sensitive equipment.

9. An apparatus in accordance with claim 8 wherein the first means for discharging is a solid state device.

10. An apparatus in accordance with claim 1 wherein the impedance means includes capacitor means in series with the two segments of the transmission line for passing radio frequency signals, and resistance in series with the two segments of the transmission line and parallel to the capacitor means.

11. An apparatus for discharging transient voltages on a transmission line for transmitting a radio frequency (RF) signal comprising:

impedance means having first and second sides for interconnecting two segments of a conductor of a transmission line for passing a radio frequency signal;

a first radio frequency choke having one end connected to a first side of the impedance means and an opposite end coupled to a first means for discharging to ground when a voltage of a signal on the transmission line exceeds a first level; and a second radio frequency choke having one end coupled to a second side of the impedance means and an opposite end coupled to a second means for discharging to ground when a voltage of a signal on the transmission line exceeds a second level greater than the first level;

a capacitor coupled between the first side of the impedance means and ground, parallel to the first radio frequency choke, for providing a circuit with high impedance to desired radio frequency signals and low impedance to undesirable radio frequency signals; and a third radio frequency choke connected between the first and second radio frequency chokes.

12. An apparatus in accordance with claim 11 wherein the impedance means further includes means for passing a substantially steady direct current.

13. An apparatus in accordance with claim 11 wherein the impedance means includes capacitor means in series with the two segments of the transmission line for passing radio frequency signals and resistance in series with the two segments of the transmission line.

14. An apparatus in accordance with claim 11 wherein:

the apparatus includes a printed circuit board;

the first, second and third chokes and the first and second means for discharging are mounted to, and electrically interconnected by, the printed circuit board; and the impedance means includes inherent capacitance associated with the printed circuit board for passing the radio frequency signal.

15. A surge suppression apparatus for an RF transmission line comprising:

impedance means for interconnection between two segments of a conductor of a transmission line for passing radio frequency signals and for inhibiting flow of transient signals;

a first means for discharging to ground when a voltage of a signal on the transmission line exceeds a first level, the first means coupled between one of the two segments of the transmission line and ground; and a second means for discharging to ground when a voltage of a signal on the transmission line exceeds a second level, the second means for discharging connected between the other one of the two segments of the transmission line and ground, the second means for discharging including a first radio frequency choke connected in series with a solid state device and having a capacitor coupled in parallel across the first choke and the solid state device.

16. A surge suppression apparatus in accordance with claim 15 further comprising a third means for discharging when a voltage of a signal on the transmission line exceeds a third level greater than the first level, the first and third means connected in parallel and coupled between the one of the two segments of the transmission line and ground.

17. A surge suppression apparatus in accordance with claim 16, further comprising means for indicating failure of the first means for discharging in response to a discharging of the third means for discharging.

18. A surge suppression apparatus in accordance with claim 17 wherein the means for indicating failure includes a fuse in series between the third means for discharging and ground and means for communicating current discharged by the third means for discharging to a remote alarm sensor in response to the fuse blowing.

19. An apparatus for discharging transient voltages on a transmission line for transmitting a radio frequency (RF) signal comprising:

impedance means having first and second sides for interconnecting two segments of a conductor of a transmission line for passing a radio frequency signal;

a resonant circuit having one side coupled to the first side of the impedance means and an opposite side coupled with a first means for discharging to ground signals when a voltage of a signal on the transmission line exceeds a first level, the resonant circuit having a high impedance to signals within a predetermined range of radio frequencies and a low impedance to voltage surges; and a second means for discharging to ground when a voltage of a signal on the transmission line exceeds a second level, the second means for discharging coupled to the second side of the impedance means.

20. An apparatus in accordance with claim 19 wherein the resonant circuit includes a capacitor coupled between the first side of the impedance means and ground.

21. An apparatus in accordance with claim 20 further comprising:

a first radio frequency choke having one end coupled to the second side of the impedance means and having an opposite end coupled to the second means for discharging; and a second radio frequency choke having one end coupled to the first means for discharging and having an opposite end coupled to the second means for discharging.

* * * * *

UNITED STATES PATENT AND TRADEMARK OFFICE

CERTIFICATE OF CORRECTION

PATENT NO. : 5,896,265
DATED : April 20, 1999
INVENTOR(S) : Glaser et al.

It is certified that error appears in the above-indentified patent and that said Letters Patent is hereby corrected as shown below:

Column 1, line 32 Delete "lightening" and insert –lightning--

Column 1, line 54 Delete "lightening" and insert –lightning--

Column 2, line 36 Delete "lightening" and insert –lightning--

Column 5, line 15 Delete "lightening" and insert –lightning--

Column 5, line 59 Delete "lightening" and insert –lightning--

Signed and Sealed this

Eighth Day of February, 2000

*Attest:*

Q. TODD DICKINSON

*Attesting Officer* *Commissioner of Patents and Trademarks*